(12) United States Patent
Taupeau et al.

(10) Patent No.: US 10,487,858 B2
(45) Date of Patent: Nov. 26, 2019

(54) DEVICE FOR CONTROLLING THE FLOW OF A FLUID WITH IN-BUILT PRESSURE THRESHOLD DETECTION

(71) Applicant: BONTAZ CENTRE R&D, Marnaz (FR)

(72) Inventors: Anthony Raymond Arthur Taupeau, Poisy (FR); Stéphane Pascal Perotto, Ayse (FR); Boris Marie Frédéric Goisque, Annecy (FR)

(73) Assignee: BONTAZ CENTRE R & D, Marnaz (FR)

( * ) Notice: Subject to any disclaimer, the term of this patent is extended or adjusted under 35 U.S.C. 154(b) by 67 days.

(21) Appl. No.: 15/318,425

(22) PCT Filed: Jun. 16, 2015

(86) PCT No.: PCT/EP2015/063424
§ 371 (c)(1),
(2) Date: Dec. 13, 2016

(87) PCT Pub. No.: WO2015/193283
PCT Pub. Date: Dec. 23, 2015

(65) Prior Publication Data
US 2017/0130746 A1    May 11, 2017

(30) Foreign Application Priority Data
Jun. 17, 2014 (FR) .................................. 14 55526

(51) Int. Cl.
*F16K 31/06* (2006.01)
*F15B 13/044* (2006.01)
(Continued)

(52) U.S. Cl.
CPC ........ *F15B 13/044* (2013.01); *F15B 13/0405* (2013.01); *G05D 16/2024* (2019.01);
(Continued)

(58) Field of Classification Search
CPC .................. Y10T 137/86622; Y10T 137/8667
See application file for complete search history.

(56) References Cited

U.S. PATENT DOCUMENTS 4,522,565 A * 6/1985 Stockton ............... F04B 49/128
417/218
5,460,198 A  10/1995 Kortge
(Continued)

FOREIGN PATENT DOCUMENTS

| CN | 101876382 A | 11/2010 |
| CN | 102007305 A | 4/2011 |
| CN | 103703289 A | 4/2014 |

OTHER PUBLICATIONS

French Search Report issued in Patent Application No. FR 14 55526 dated Mar. 9, 2015.
(Continued)

*Primary Examiner* — Robert K Arundale
(74) *Attorney, Agent, or Firm* — Pearne & Gordon LLP

(57) ABSTRACT

Valve with in-built pressure threshold detection, mounted in an engine block pipe, the valve comprising a body comprising an electrically insulating external element (16) and an electrically conducting internal element (18) bearing the obturator seat (14), an obturator (12), the valve also comprising an electrical terminal (34) connected to a detection system which, with the engine block (4) and the internal element (18), forms an electric circuit, the internal element (18) being in permanent contact with the electrical terminal (34), the internal element (18) sliding in the external element (16) such that, for a pressure below the threshold pressure, the internal element (18) is in electrical contact with the engine block, closing the electric circuit, and for a pressure equal to or greater than the threshold pressure, the internal
(Continued)

element (18) is not in electrical contact with the engine block, breaking the electric circuit.

15 Claims, 4 Drawing Sheets

(51) Int. Cl.
F15B 13/04 (2006.01)
G05D 16/20 (2006.01)
F15B 13/02 (2006.01)

(52) U.S. Cl.
CPC ........ *G05D 16/2097* (2019.01); *F15B 13/027* (2013.01); *F15B 2013/0409* (2013.01); *F15B 2013/0448* (2013.01); *Y10T 137/8667* (2015.04); *Y10T 137/86622* (2015.04)

(56) References Cited

U.S. PATENT DOCUMENTS

| | | | |
|---|---|---|---|
| 5,580,817 A | 12/1996 | Kortge | |
| 5,685,332 A * | 11/1997 | Overdiek | B62D 5/062 137/115.04 |
| 5,857,478 A | 1/1999 | Davison et al. | |
| 6,328,535 B1 | 12/2001 | Brighton et al. | |
| 7,216,662 B2 * | 5/2007 | Okamoto | B62D 5/062 137/115.05 |
| 8,167,000 B2 | 5/2012 | Neff | |
| 9,328,867 B2 | 5/2016 | Frenal | |
| 2010/0270487 A1 | 10/2010 | Ambrose | |
| 2016/0047290 A1 | 2/2016 | Clement et al. | |

OTHER PUBLICATIONS

International Search Report issued in Patent Application No. PCT/EP2015/063424 dated Sep. 9, 2015.
Written Opinion issued in Patent Application No. PCT/EP2015/063424 dated Sep. 9, 2015.
Chinese Office Action with translation issued to CN Application No. 201580032896.4 dated Sep. 28, 2017.

* cited by examiner

DEVICE FOR CONTROLLING THE FLOW OF A FLUID WITH IN-BUILT PRESSURE THRESHOLD DETECTION

TECHNICAL FIELD AND STATE OF THE PRIOR ART

The present invention relates to a device for controlling the flow of a fluid, notably to a valve or an electromagnetic valve, with in-built threshold detection, for example implemented in an automobile vehicle.

Valves are implemented in hydraulic circuits in order to control the flow of a fluid. The valves open when the pressure of the fluid exceeds a given value, their operation is uniquely mechanical.

Electromagnetic valves may also be implemented, said electromagnetic valves comprise a solenoid which, when it is supplied with current, allows the obturator to move away from its seat, enabling flow of fluid through the electromagnetic valve.

Hydraulic circuits are also equipped with one or more devices enabling the detection of a threshold pressure. These devices are for example called pressure switches, the exceeding of the threshold pressure is detected by the opening of an electric circuit.

Internal combustion engines are often equipped with one or more of these manocontacts in order to collect via electric information the pressure state of the hydraulic circuit.

Yet, in particular in the automobile field, it is desirable to reduce the size of the different components, to reduce the number of these components and to simplify their mounting, notably for reasons of production costs, size and weight.

DESCRIPTION OF THE INVENTION

It is consequently an aim of the present invention to offer a device making it possible both to control the flow of a fluid and to detect a threshold pressure.

The aforementioned aim is attained by a device for controlling the flow of a fluid in a pipe, comprising a body, an obturator cooperating with an obturator seat, the body being formed of an external element and an internal element, the internal element being capable of sliding in the external element and bearing the obturator seat. The internal element is electrically conducting and the external element is electrically insulating. The internal element is capable of moving with respect to the external element, under the effect of the pressure of the fluid in such a way that, for a pressure below the threshold pressure to detect, it closes or opens an electric circuit and such that for a fluid pressure greater than or equal to the given threshold, it opens or closes the electric circuit respectively, the electric circuit being in part formed by at least the internal element and an area of the frame in which the pipe is formed.

In other words, the pressure threshold detection means are directly built into the body of the device.

The size is thus reduced, the mounting is simplified since there is now only one component to mount instead of two.

The device for controlling the flow of fluid may be a valve or an electromagnetic valve.

The device may be implemented in a hydraulic circuit of an automobile vehicle, the frame then being formed by the engine block which is connected to the electrical ground of the vehicle.

The subject-matter of the present invention then is a device for controlling the flow of fluid with in-built pressure threshold detection comprising flow interrupting and enabling means intended to be arranged in a pipe of a frame connecting a fluid source and an area to supply with fluid, said frame comprising at least one electrically conducting area, flow interrupting and enabling means comprising a body bearing a first obturator seat, an obturator configured to cooperate in a leak tight manner with the obturator seat, a first elastic return means applying a return force on the obturator in the direction of the first obturator seat, said body comprising an internal element bearing the obturator seat, said internal element being electrically conducting, said body also comprising an external element at least in part electrically insulating so as to be electrically insulated from at least the conducting area of the frame, the device also comprising an electrical connection intended to be connected to a detection system, said detection system forming, with at least the conducting area of the frame and the internal element, an electrical detection circuit, the internal element being in permanent contact with the electrical connection, the internal element being capable of sliding in a substantially leak tight manner in the external element such that, when the pressure of the fluid exceeds the threshold pressure, the electric circuit passes from a closed state to an open state or when the pressure of the fluid exceeds the threshold pressure the electric circuit passes from an open state to a closed state.

In an example of embodiment, in a first operating state for a pressure below the threshold pressure, the internal element is in electrical contact with the conducting area of the frame and the electric circuit is closed and in a second operating state for a pressure greater than or equal to the threshold pressure, the internal element is not in electrical contact with the conducting area of the frame and the electric circuit is open.

According to an additional characteristic, the control device may comprise a second means of elastic return of the internal element in the direction of the conducting area of the frame, said second elastic return means being electrically conducting and forming a part of the electrical detection circuit.

According to another additional characteristic, the control device may comprise a vent hole and the internal element may comprise a second obturator seat such that, when the flow interrupting and enabling means allow flow, the obturator bears on the second obturator seat and communication between the area to supply and the vent hole is interrupted.

According to another additional characteristic, the control device comprises a stop borne by the external element, such that it limits the sliding of the internal element under the effect of the pressurised fluid.

Advantageously, the control device comprises an electrically conducting intermediate connection part with which the internal element is intended to be in electrical and mechanical contact in the first operating state, and not to be in electrical and mechanical contact in the second operating state, the intermediate connection part being intended to be in permanent mechanical and electrical contact with at least the conducting area of the frame.

Preferably, the intermediate connection part comprises an elastically deformable electrically conducting area configured to be in permanent electrical contact with the electrically conducting area of the frame, ensuring a take up of clearances and a permanent electrical contact with the frame.

In one embodiment, the flow interrupting and enabling means are formed by a valve, said valve opening when the pressure of the fluid is at least equal to a supply pressure greater than the threshold pressure.

In another embodiment, the flow interrupting and enabling means are formed by an electromagnetic valve. The electromagnetic valve may comprise a solenoid and a conducting and magnetic loop, said loop forming a part of the electrical detection circuit.

The control device may comprise an electrical connection for electrically supplying the solenoid, said electrical connection being advantageously adjacent to the electrical connection of the detection circuit.

Another subject-matter of the present invention also is a hydraulic system comprising a frame in which is formed a hydraulic circuit, at least one control device according to the invention mounted in the hydraulic circuit, and a system for detecting a threshold pressure in the hydraulic circuit, said detection system comprising an electrical supply, said electrical connection of the control device being connected to the detection system connected to the conducting area of the frame so as to form the electrical detection circuit.

The frame may be made of electrically conducting material.

Another subject-matter of the present invention also is an automobile vehicle comprising an engine block and at least one system according to the invention, the engine block forming the frame. The engine block is advantageously connected to the electrical ground of the automobile vehicle.

BRIEF DESCRIPTION OF THE DRAWINGS

The present invention will be better understood on the basis of the description that follows and from the appended drawings, in which.

DETAILED DESCRIPTION OF PARTICULAR EMBODIMENTS

The invention will now be described in an application to an automobile vehicle, but the invention applies to all fields comprising a hydraulic circuit in which it is wished to control the flow of a fluid and to know its pressure compared to a threshold.

Upstream and downstream are to be considered from left to right in the representations of the drawings. Elements and parts having identical or similar functions and shapes will be designated by the same reference.

Figure 1:
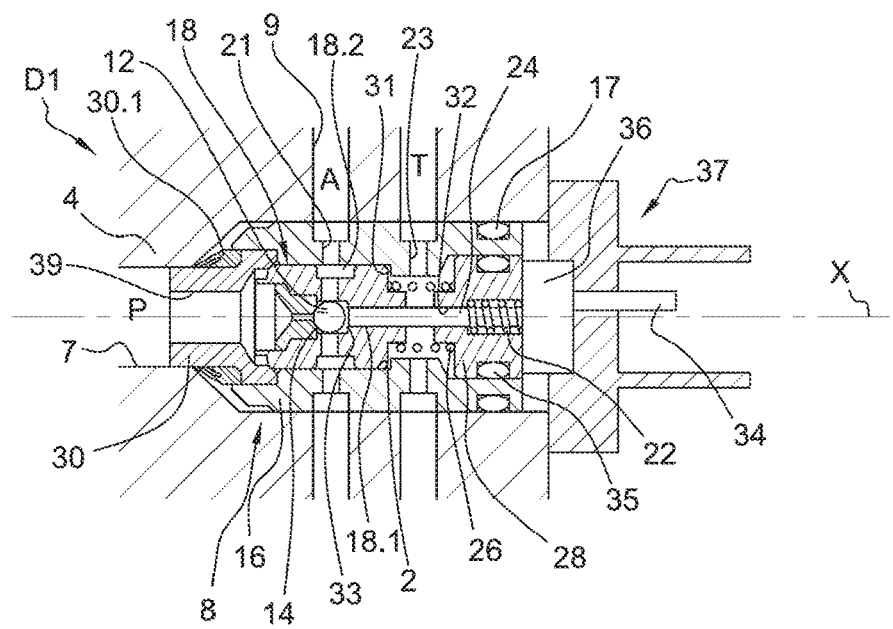
FIG. 1 is a view in longitudinal section of a first embodiment of a control device according to the invention comprising a ball valve in a state where the pressure is below the threshold pressure to detect.
Figure 2:
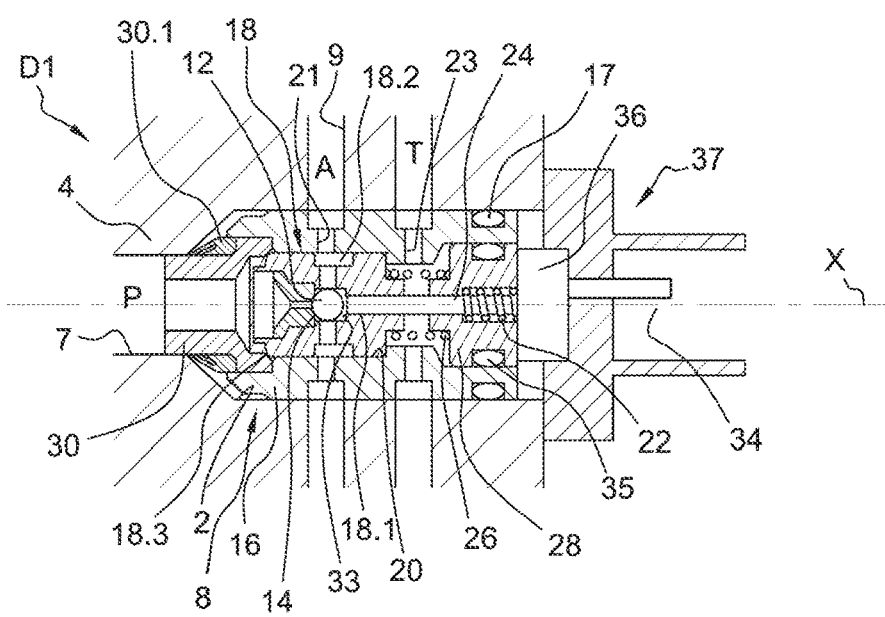
FIG. 2 is a view in longitudinal section of the device of FIG. 1 in a state where the pressure is greater than or equal to the threshold pressure to detect.

In FIGS. 1 and 2 may be seen a first embodiment of a device D1 according to the invention mounted in a tapping 2 formed in an engine block 4. The device D1 is intended to control the flow of a fluid between a fluid source designated P and an area to supply designated A. The device D1 comprises a valve 8 arranged between the source P and the area A; the valve is intended to prevent the flow of fluid between the source P and the area A as long as the pressure is below a given opening pressure and to allow flow when this pressure is greater than or equal to the opening pressure. In the example represented, the tapping 2 is connected to the source P by a pipe 7 and to the area A by a pipe 9. The device is partially mounted in the tapping 2.

The valve has in the example represented a substantially cylindrical shape of revolution around a longitudinal axis X.

The valve 8 comprises a body 10 mounted in the tapping 2, an obturator 12 and an obturator seat 14 with which the obturator 12 cooperates so as to interrupt or enable flow through the valve 8.

The body comprises an external element 16 and an internal element 18.

The external element 16 comprises a longitudinal channel 20 extending over its whole length. The external element 16 is mounted fixed in the tapping 2 and the internal element 18 is mounted capable of sliding in the longitudinal channel 20.

The external element 16 is adjusted in the tapping so as to ensure a substantially leak tight mounting in the absence of a leak tight seal between the pipe 7 and the pipe 9; leaks may appear but these are negligible. In a variant, sealing means could be implemented.

Preferably and as is represented, the external element 16 comprises at one downstream longitudinal end a leak tight seal 17, for example an O-ring, on its external lateral surface so as to ensure a leak tight mounting of the device in the engine block and to avoid any leakage to the outside of the engine block.

The internal element 18 is also adjusted in the channel 20 of the external element 16 so as to ensure a substantially leak tight sliding in the absence of a leak tight seal; leaks may appear but these are negligible. In a variant, sealing means, such as O-rings, could be implemented in each path.

The obturator seat 14 is borne by the internal element 18.

The external element 16 comprises at least one or more first radial tappings 21 situated downstream of the obturator seat 14 and placing in communication the portion of the channel 20 downstream of the valve seat 14 and the area A.

Advantageously, the external element 16 comprises one or more second radial tappings 23 formed downstream of the internal element 18 to a vent hole T.

The internal element 18 also comprises a longitudinal channel 18.1 and one or more radial tappings 18.2 for placing in communication the channel 18.1 and the first tapping 21 of the external element 16.

In the example represented, the obturator 12 is formed by a ball. A first elastic return means 22, for example a helical spring, in the direction of the valve seat 14 is mounted in reaction between a rod 24 bearing on the ball 12 and a fixed part of the valve. The load of the first elastic means 22 is chosen so that the ball 24 detaches from the obturator seat 14 for a fluid pressure greater than or equal to a given opening pressure. In a variant, the rod 24 could be omitted, the ball then resting directly on the spring 22.

The internal element 18 is capable of being moved in the channel 20 under the effect of the pressure of the fluid applying on its upstream face 18.3.

The device also comprises a second elastic return means 26, for example a helical spring, mounted in reaction between the internal element 18 and a fixed downstream part 28 of the device.

The load of the second elastic means 26 is chosen to enable the internal element 18 to slide downstream for a fluid pressure exerting on its upstream face 18.3 greater than or equal to a threshold pressure that it is wished to detect.

The threshold pressure to detect is below the opening pressure of the valve.

The internal element 18 is electrically conducting and the external element 16 is electrically insulating so as not to place in electrical contact the internal element and the engine block, and more generally the conducting area of the frame in which the circuit is formed.

In the example represented, the internal element 18 is entirely made of electrically conducting material for example steel, aluminium, gold, silver, etc., and the external element 16 is entirely made of electrically insulating material, for example plastic, anodised aluminium.

In a variant, it may be envisaged that the external element is made of electrically conducting material but electrically insulated from the engine block, for example by a shell made of electrically insulating material. It could for example be made of anodised aluminium. The internal element 18 could comprise an electrically conducting area in an electrically insulating material.

The engine block is also made of an electrically conducting material for example steel or aluminium.

In the example represented, an intermediate connection part 30 in the form of a connection end fitting is advantageously mounted in an upstream end of the external element 16 upstream of the internal element 18 and in permanent contact with the engine block. The connection end fitting 30 comprises a channel 39 enabling the flow of fluid from the source P to the upstream face 18.3 of the internal element 18. The connection end fitting 30 is made of electrically conducting material and is electrically connected to the engine block in an advantageous manner through the intermediary of an annular electrical contact element 30.1 of strip type. The end fitting 30 is for example made of steel, aluminium, stainless steel, etc.

The internal element 18 is capable of sliding in the external element 16 between a first position in which it is in mechanical and electrical contact by its upstream face 18.3 with the connection end fitting 30 and a second position in which the upstream face 18.3 of the internal element 18 is at a distance from the connection end fitting 30, the electrical contact then being broken.

In the example represented, the internal element 16 takes the first position when the fluid pressure is below the threshold to detect and takes the second position when the fluid pressure is greater than or equal to the threshold to detect.

The connection end fitting advantageously makes it possible to guarantee permanent electrical contact with the engine block. In fact, according to the chain of dimensions of the components and the vibrations of the engine, this end fitting enables clearances to be taken up in order to guarantee permanent electrical contact thanks to the spring function fulfilled by the strip contact.

The external element 16 advantageously comprises an axial stop limiting the sliding of the internal element 18 downstream, the axial stop is for example formed by a shoulder 31 realised in the internal surface of the channel 20 between the first tapping 21 and the second tapping 23.

The internal element 18 comprises a second obturator seat 33 downstream of the first obturator seat 14 such that the ball 12 bears against the second obturator seat 33 and stops flow through the internal element 18 between the first tapping 21 and the second tapping 23 of the external element.

The downstream part 28 seals in a leak tight manner a downstream end of the channel 20. For example, an O-ring 35 is mounted between the external lateral surface of the downstream part 28 and the internal surface of the channel 20. In the example represented, the rod 24 bearing on the ball 14 is mounted sliding in a boring 32 of the downstream part 28 ensuring axial guiding of the rod 24.

The device also comprises at its downstream end outside of the body an electrical detection terminal 34 in permanent electrical contact with the internal element 18 and intended to be connected to a detection system. The device also comprises an electrical connector 37 surrounding the terminal 34 and ensuring the mechanical assembly to an electrical terminal of the detection system. The electrical connector also ensures the mechanical assembly of the device with the engine block via added screws for example.

The electrical connector is preferably made of electrically insulating material in order not to perturb electrical conduction inside the device since it is both in contact with the terminal 34 and the engine block. In a variant, it could be made of a conducting material and electrically insulated from the terminal and/or the engine block.

In the example represented, the internal element 16 is electrically connected to the terminal 34 through the intermediary of the second return means 26 which are electrically conducting, the downstream part 28 which is electrically conducting and an electrical contact 36 interposed between the downstream part and the terminal 34 and ensuring electrical continuity.

In a variant, the downstream part 28 could be omitted and the internal element 18 would be electrically connected to the contact 36 directly by the second elastic return means.

According to yet another variant, the second elastic return means 26 could be electrically insulating and a flexible conductor, for example of wired type that would not oppose the sliding of the internal element, could connect the internal element and the downstream part 28 or the internal element 18 and the contact 36 directly.

The detection system comprises at least the engine block and an electrical supply source, and forms with the internal element an electrical detection circuit.

In the case of an automobile vehicle, the engine block is advantageously connected to the electrical ground of the vehicle as well as the electrical supply source which may be the battery of the automobile vehicle.

The operation of the control device D1 with in-built pressure threshold detection will now be described.

When the pressure of the fluid coming from the source P is below the threshold pressure to detect and thus below the opening pressure of the valve, the internal element 18 is maintained, under the effect of the load of the second elastic means 26, in its first position represented in FIG. 1 in mechanical and electrical contact with the connection end fitting 30 by its upstream face 18.3. The connection end fitting 30 being permanently in electrical contact with the engine block connected to the electrical ground and the internal element 18 being permanently in electrical contact with the terminal 34 connected to the detection system, the electrical detection circuit is closed. Current flows. The detection system detects that the pressure of the fluid is below the threshold pressure. An indicator light may for example be lit, said indicator light being mounted for example in series in the detection circuit. Any other alarm device may be implemented.

When the pressure of the fluid is greater than or equal to the threshold pressure, said pressure being exerted on the upstream face 18.3 of the internal element 18, it is moved downstream against the second elastic means 26, and moves away from the connection end fitting 30. The mechanical and electrical contact between the connection end fitting 30 and the internal element 18 is then broken. The fluid situated downstream of the internal element 18 is evacuated via the vent hole and does not oppose the movement of the internal element.

The internal element abuts against the shoulder of the external element. The ball bearing on the valve seat moves with the internal element, the valve remains closed.

The detection circuit is open. The detection system detects the opening of the circuit and deduces therefrom that the pressure of the fluid is equal to or greater than the threshold pressure. The indicator light goes out.

When the pressure of the fluid again passes below the threshold pressure, the internal element 18 is pushed back to the connection end fitting 30 and again enters into contact therewith under the effect of the load of the second return means 26.

When the pressure of the fluid exceeds the opening pressure, since the internal element 18 abuts against the shoulder 31, it no longer moves downstream, the ball 12 can detach from the obturator seat 14 and come to bear on the second obturator seat 33, enabling on the one hand flow between the source P and the area to supply A and interrupting communication between the area A and the vent hole.

The present invention makes it possible not to perturb the operation of the valve.

The device according to the invention ensures both a function of valve and a function of pressure threshold detection while offering great compactness and reliable operation.

In a variant, it could be envisaged not to implement the connection end fitting 30 and to have a direct mechanical and electrical contact between the internal element and the engine block. Such a variant is represented in FIG. 6.

Nevertheless the connection end fitting advantageously makes it possible to avoid deterioration of the engine block, by avoiding direct mechanical contact between the engine block and the internal element. In fact, the internal element is intended to enter into electrical contact in a repeated manner with the engine block under the effect of the second return means 26. These repeated contacts could damage the engine block.

The materials of the connection end fitting and the internal element are thus made of materials avoiding such damage during contact there between. They are for example made of the same material.

Figure 6:
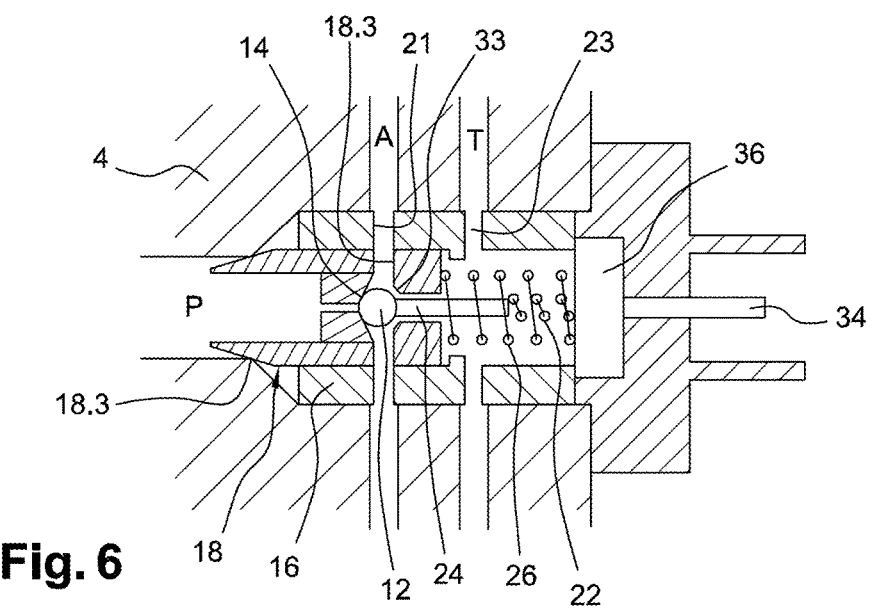
FIG. 6 is a longitudinal view represented schematically of a variant of embodiment of the first embodiment of a control device according to the invention comprising a ball valve in a state where the pressure is below the threshold pressure to detect.
Figure 7:
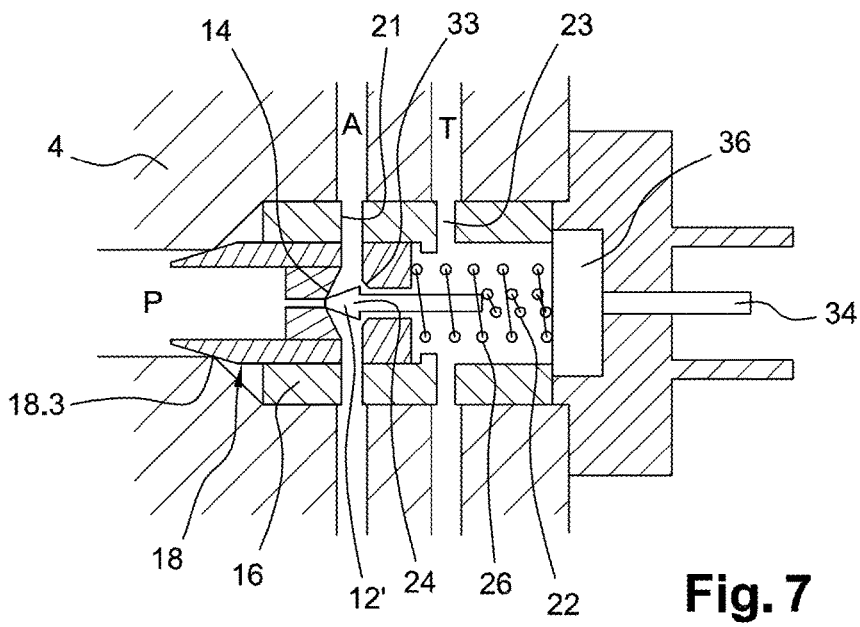
FIG. 7 is a longitudinal view represented schematically of another variant of embodiment of the first embodiment of a control device according to the invention comprising a piston valve in a state where the pressure is below the threshold pressure to detect.

In FIG. 7 may be seen a variant of the device of FIG. 6 in which the obturator 12 is formed by a piston 12'. This also applies to the device of FIGS. 1 and 2.

Figure 3:
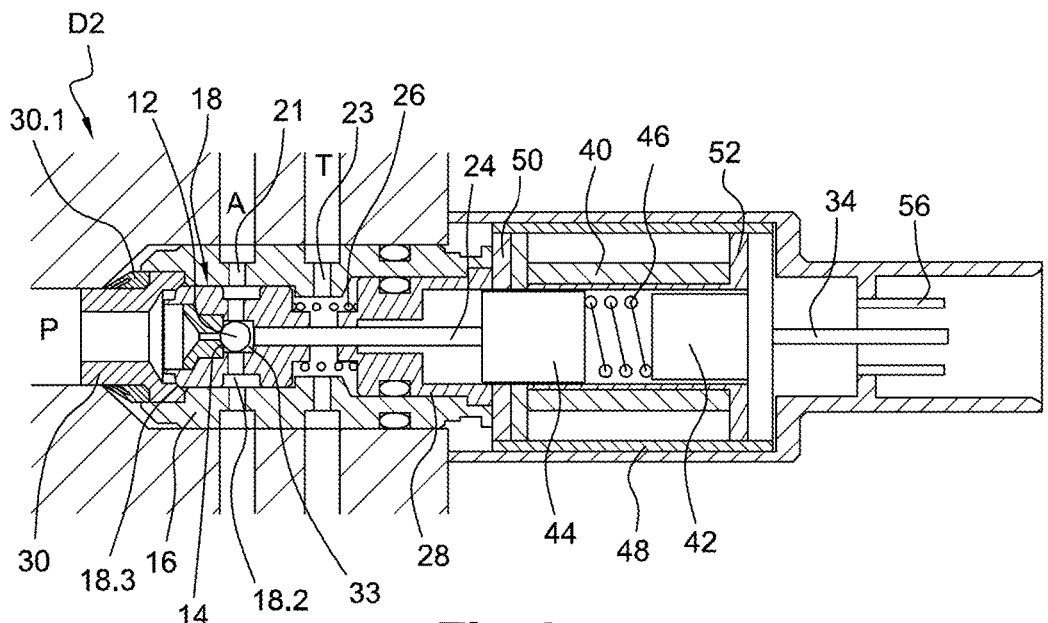
FIG. 3 is a view in longitudinal section of a second example of a device for controlling pressure according to the invention comprising an electromagnetic valve in a state where the pressure is below the threshold pressure to detect, the electromagnetic valve being closed.
Figure 4:
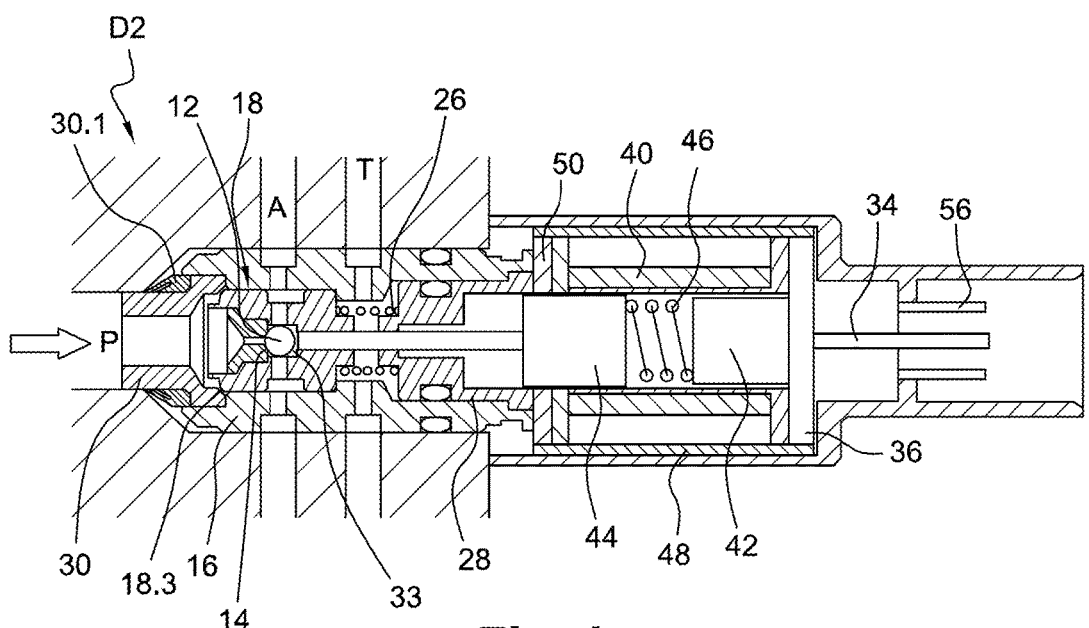
FIG. 4 is a view in longitudinal section of the device of FIG. 3 in a state where the pressure is greater than or equal to the threshold pressure to detect, the electromagnetic valve being closed.
Figure 5:
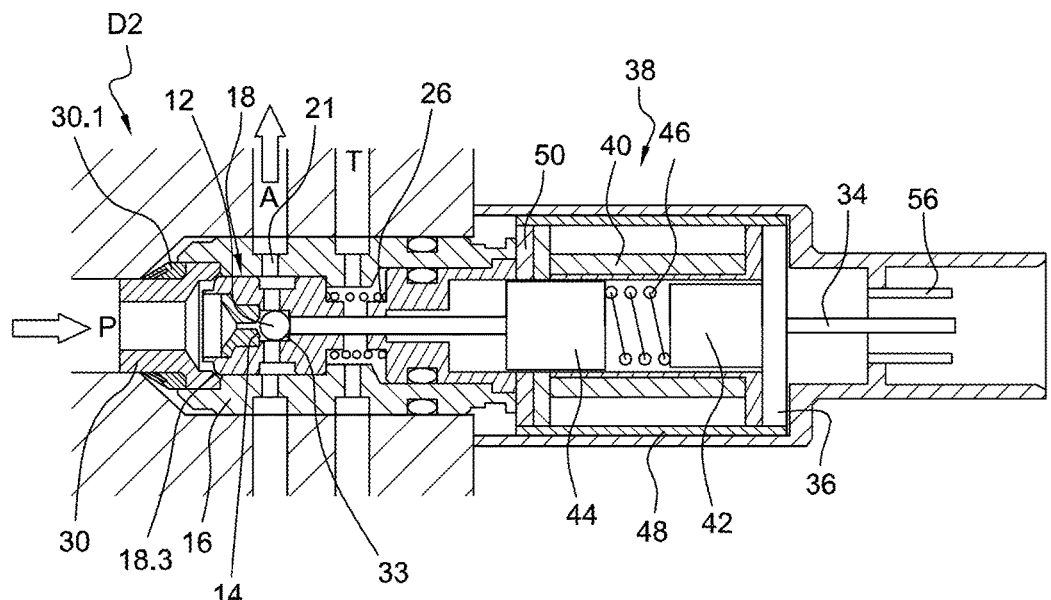
FIG. 5 is a view in longitudinal section of the device of FIG. 3 in a state where the pressure is greater than or equal to the threshold pressure to detect, the electromagnetic valve being open.

A second example of embodiment will now be described in relation with FIGS. 3 to 5.

The second embodiment differs from the first embodiment mainly by the fact that it is an electromagnetic valve and not a mechanical valve, i.e. that the flow is controlled by an electrical signal and not by the level of pressure of the fluid coming from the source.

The control device D2 comprises downstream of the internal element 18 the control means 38 of the electromagnetic valve.

The control means 38 are situated outside of the engine block.

In the example represented, the control means 38 comprise a solenoid 40 of axis X, a fixed core 42 and a moveable core 44 arranged inside the solenoid, a return means 46, for example a return spring acting between the fixed core 42 and the moveable core 44. The moveable core is slidingly integral with a downstream end of the rod 24. The control means also comprise a shell 48 radially surrounding the solenoid 40, an upstream end shield 50 and the contact 36 in electrical contact with the shell 48. The shell 48, the upstream end shield 50 and the contact 36 form a magnetic and conducting loop of the electromagnetic valve. The movement of the moveable core 44 downstream enables the ball 12 to detach from its first obturator seat 14.

In the example represented, the downstream part 28 has a hollowing in which the moveable core 44 is capable of sliding.

An electrical terminal 56 of the electromagnetic valve is provided outside of the device to enable the electrical supply of the solenoid 40. It is advantageously arranged in a manner adjacent to the detection terminal 34 in the connector 37, thus enabling a simultaneous connection of the detection terminal 34 and the terminal 56 of the electromagnetic valve to the electrical system.

The internal element 18 is permanently electrically connected to the detection terminal 34 by the second return means 26, the downstream part 28, the upstream end shield 50, the shell 48 and the contact 36. The number of components implemented is reduced since elements already having another function are used.

In a variant, as for the first embodiment, a wired electrical connection could be formed on all or part of the electrical path between the internal element 18 and the detection terminal 34.

In the example represented, the electromagnetic valve is of the three-way, two positions, type. The electromagnetic valve may be of the proportional type or the on/off type.

The function of the device D2 will now be described.

Firstly the case will be considered where the electromagnetic valve is closed, i.e. the ball 12 bears on the first obturator seat 14. When the pressure of the fluid coming from the source P is below the threshold pressure to detect, the internal element 18 is maintained, under the effect of the load of the second elastic means 26, in its first position represented in FIG. 3 in mechanical and electrical contact with the connection end fitting 30 by its upstream end. The connection end fitting 30 being permanently in electrical contact with the engine block connected to the electrical ground and the internal element 18 being permanently in electrical contact with the terminal 34 connected to the detection system, the electrical detection circuit is closed. Current flows. The detection system detects that the pressure of the fluid is below the threshold pressure. An indicator light may for example be lit, this being mounted for example in series in the detection circuit.

When the pressure of the fluid is greater than or equal to the threshold pressure, said pressure being exerted on the upstream face 18.3 of the internal element 18, it is moved against the second elastic means 26, and moves away from the connection end fitting 30, the mechanical and electrical contact between the connection end fitting 30 and the internal element is open. The fluid situated downstream of the internal element 18 is evacuated via the vent hole and does not oppose the movement of the internal element 18. The return means 46 are also compressed.

The internal element 18 abuts against the shoulder of the external element. The ball 12 bearing on the first obturator seat 14 moves with the internal element 18, communication between the source P and the area A is still interrupted. The detection circuit is open. The detection system detects the opening of the circuit and deduces therefrom that the pressure of the fluid is equal to or greater than the threshold pressure. The indicator light goes out (FIG. 4).

When the pressure of the fluid again passes below the threshold pressure, the internal element 18 is pushed back to the connection end fitting 30 and once again enters into contact therewith under the effect of the load of the second return means 26.

When the pressure is greater than the threshold pressure and when an order is sent to the electromagnetic valve to allow flow between the source P and the area A, the solenoid 40 is supplied with current, the moveable core 44 moves downstream, the ball 12 detaches from the first obturator seat 14 and comes in contact against the second seat, of the obturator 33, flow between the source P and the area A is allowed and communication between the area A and the vent hole is interrupted. Simultaneously, the internal element 18 is moved downstream, moving away from the connection end fitting 30, the detection circuit is open. The indicator light goes out (FIG. 5).

When the pressure is below the threshold pressure and when an order is sent to the electromagnetic valve to allow flow between the source P and the area A, the solenoid 40 is supplied with current, the moveable core 44 moves downstream, the ball 12 detaches from the first obturator seat 14 and comes in contact against the second obturator seat 33, flow between the source P and the area A is allowed and communication between the area A and the vent hole is interrupted. The internal element 18 remains immobile with respect to the external element 16 bearing against the connection end fitting 30 under the effect of the load of the second elastic return means 26. The detection circuit remains closed and the indicator light remains lit.

The device D2 according to the invention ensures both a function of electromagnetic valve and a function of threshold pressure detection while offering great compactness and reliable operation.

The detection of the threshold pressure may for example serve to control the opening of the electromagnetic valve.

Figure 8:
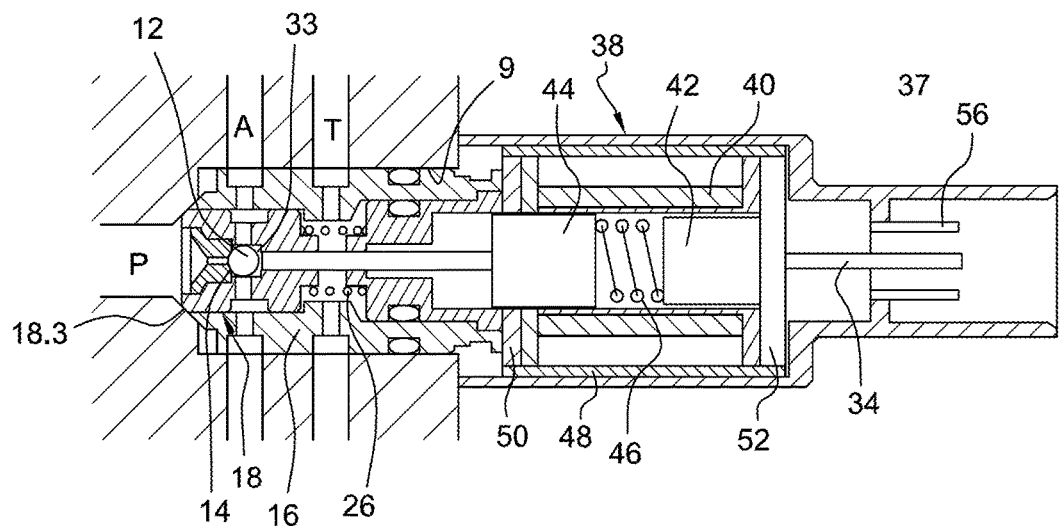
FIG. 8 is a longitudinal view of a variant of embodiment of the second embodiment of a control device according to the invention in a state where the pressure is below the threshold pressure to detect.

As for the first embodiment, it could be envisaged not to implement the connection end fitting 30 and to have a direct mechanical and electrical contact between the internal element and the engine block, for example in the case of materials, the repeated contacts of which do not cause deterioration. This variant is represented in FIG. 8.

As for the first embodiment, the obturator may be formed by a piston or any suitable element.

In the description below, the exceeding of the threshold pressure causes the opening of the detection circuit. It could be provided, conversely, that the circuit is open for a pressure below the threshold pressure and that it closes when the pressure is equal to or greater than the threshold pressure. To do so, it could for example be provided that contact with the frame takes place by means of an electrical contact situated at the level of the shoulder forms a stop and connected to the frame through the external element.

Furthermore, in the case of a hydraulic circuit formed in an engine block, the whole engine block is electrically conducting but it could be envisaged that the frame in which the hydraulic circuit is formed only comprises one electrically conducting area situated so as to be connected either permanently to the connection end fitting, or to the upstream face of the moveable internal element in an intermittent manner.

Moreover, in the case of an engine block of an automobile vehicle, the electrical ground of the vehicle is advantageously used to form a part of the detection circuit, but it may be provided to form a wired detection circuit between the frame and the electrical supply source.

The device according to the invention thus makes it possible in an in-built and reliable manner to carry out both a diagnostic of the pressure level in the hydraulic circuit and to control the flow of fluid.

The fluid may be motor oil in the case of an engine lubrication circuit. The device may be implemented in the cooling circuit (cooling liquid=50% ethylene glycol+50% water) or water circuit or in the brake fluid circuit or in the liquid circuit for catalytic reduction of NOX gases contained in the exhaust gases, the liquid being an aqueous urea solution, for example sold under the tradename Adblue®. The device according to the invention may be also any hydraulic circuit in any technical field in which it is wished to perform a detection of threshold pressure of fluid and to control the flow of fluid.

What is claimed is:

1. A control device for controlling the flow of a fluid with in-built pressure threshold detection comprising flow interrupting and enabling means configured to be arranged in a pipe of a frame connecting a fluid source and an area to supply with fluid, said frame comprising at least one electrically conducting area, the flow interrupting and enabling means comprising a body bearing a first obturator seat, an obturator configured to cooperate in a leak tight manner with the first obturator seat, a first spring applying a return force on the obturator in the direction of the first obturator seat, said body comprising an internal element bearing the first obturator seat, said internal element being electrically conducting, said body also comprising an electrically insulating external element, which is electrically insulating, so as to be electrically insulated from at least the conducting area, the device also comprising an electrical connection configured to be connected to a detection system, said detection system forming, with at least the conducting area of the frame and the internal element, an electrical detection circuit, the internal element being in permanent contact with the electrical connection, the internal element being capable of sliding in a substantially leak tight manner in the external element such that, when the pressure of the fluid is greater than or equal to the threshold pressure, the electric detection circuit passes from a closed state to an open state or when the pressure of the fluid is greater than or equal to the threshold pressure the electric detection circuit passes from an open state to a closed state.

2. The control device according to claim 1, in which in a first operating state for a pressure below the threshold pressure, the internal element is in electrical contact with the conducting area of the frame and the electric detection circuit is closed and in a second operating state for a pressure greater than or equal to the threshold pressure, the internal element is not in electrical contact with the conducting area of the frame and the electric detection circuit is open.

3. The control device according to claim 1, comprising a second elastic spring applying a return force on the internal element in the direction of the conducting area of the frame, said second elastic spring being electrically conducting and forming a part of the electrical detection circuit.

4. The control device according to claim 1, comprising a vent hole and in which the internal element comprises a second obturator seat such that, when the flow interrupting and enabling means allow flow, the obturator bears on the second obturator seat and communication between the area to supply and the vent hole is interrupted.

5. The control device according to claim 1, comprising a stop borne by the external element, such that the stop limits the sliding of the internal element under the effect of the pressurised fluid.

6. The control device according to claim 2, comprising an electrically conducting intermediate connection part with which the internal element is configured to be in electrical and mechanical contact in the first operating state, and not to be in electrical and mechanical contact in the second operating state, the conducting intermediate connection part being configured to be in permanent mechanical and electrical contact with at least the conducting area of the frame.

7. The control device according to claim 6, in which the conducting intermediate connection part comprises an elastically deformable electrically conducting area configured to be in permanent electrical contact with the electrically conducting area of the frame.

8. The control device according to claim 1, in which the flow interrupting and enabling means are formed by a valve, said valve opening when the pressure of the fluid is at least equal to a supply pressure greater than the threshold pressure.

9. The control device according to claim 1, in which the flow interrupting and enabling means are formed by an electromagnetic valve.

10. The control device according to claim 9, in which the electromagnetic valve comprises a solenoid and a conducting and magnetic loop, said magnetic loop forming a part of the electrical detection circuit.

11. The control device according to claim 10, comprising an electrical connection for electrically supplying the solenoid, said electrical connection being adjacent to the electrical connection of the electrical detection circuit.

12. A hydraulic system comprising a frame in which is formed a hydraulic circuit, at least one control device according to claim 1 mounted in the hydraulic circuit, and a detection system for detecting a threshold pressure in the hydraulic circuit, said detection system comprising an electrical supply, said electrical connection of the control device being connected to the detection system connected to the conducting area of the frame so as to form the electrical detection circuit.

13. The hydraulic system according to claim 12, in which the frame is made of electrically conducting material.

14. An automobile vehicle comprising an engine block and at least one system according to claim 12, the engine block forming the frame.

15. The automobile vehicle according to claim 14, in which the engine block is connected to an electrical ground of the automobile vehicle.

* * * * *